Patented May 6, 1952

2,595,785

UNITED STATES PATENT OFFICE 2,595,785

TOPPED OXO ALCOHOL TREATMENT BY CAUSTIC AND AIR

Cecil H. Hale, Baton Rouge, La., assignor to Standard Oil Development Company, a corporation of Delaware No Drawing. Application October 8, 1949, Serial No. 120,423

3 Claims. (Cl. 260—638)

This invention relates to a one-step treatment method for alcohols, particularly with respect to purification of the finished alcohol product and improvement of color and odor qualities. More specifically, the present invention is directed toward a novel purification method for alcohol products obtained by the catalytic reaction of olefins with hydrogen and carbon monoxide to give reaction mixtures consisting substantially of carbonyl compounds which are subsequently hydrogenated in the presence of a sulfur-insensitive catalyst under conditions sufficiently stringent to obtain substantially complete conversion of carbonyl groups to alcoholic hydroxyl groups.

The synthesis of oxygenated organic compounds from olefinic compounds and mixtures of carbon monoxide and hydrogen under suitable conditions is well known in the art. The olefinic starting material is allowed to react in the liquid state with carbon monoxide and hydrogen in the presence of a metal catalyst, usually an iron group metal catalyst, such as a suitable cobalt compound to form, in a first or oxonation stage, organic carbonyl compounds such as aldehydes, ketones, and acids having one carbon atom more per molecule than the olefinic feed material together with some condensed higher molecular weight products such as acetals, hemiacetals, and esters. The carbonyl compounds which predominate in the product are then usually subjected to hydrogenation in a second stage to produce the corresponding alcohols, usually in a rather impure state.

Practically all types of organic compounds having an olefinic double bond may be used as starting materials to the first or oxygenation stage including aliphatic olefins and diolefins, cyclo-olefins, aromatics with olefinic side chains, oxygenated compounds having olefinic double bonds, etc. The metal catalyst is preferably used in the form of a fatty acid salt soluble in the olefinic feed stock, such as the naphthenates, stearates, oleates, etc. of cobalt, iron or nickel. Suitable reaction conditions include temperatures of about 150°–450° F., pressures of about 100 to 300 atm., $H_2:CO$ ratios of about 0.5–4.0:1, liquid feed rates of about 0.5–5 v./v./hr. and gas feed rates of about 1,000–45,000 standard cu. ft. of $H_2+CO$ per barrel of liquid olefinic feed.

The hydrogenation stage may be operated at conventional hydrogenation conditions which include temperatures, pressures, gas and liquid feed rates approximately within the ranges specified above for the first stage. Various known types of hydrogenation catalysts including nickel, tungsten, molybdenum, their oxides and sulfides and others may be used. These catalysts may be supported on some suitable carrier such as charcoal. The liquid product from the hydrogenation stage is worked up by distillation to separate the desired alcohols from unconverted olefinic feed material, unhydrogenated carbonyl compounds, and hydrocarbons formed in the process.

The overall carbonylation or so-called "Oxo" reaction as outlined above, provides a particularly effective method for preparing valuable primary alcohols, particularly of the $C_4$ to $C_{12}$ range. One of the largest and most important uses developed for the synthetic alcohol products is that of producing esters suitable for plasticizers, by reaction with both aliphatic and aromatic acids or anhydrides including such examples as phthalic acid and anhydride, maleic acid, adipic acid, and also phthalic and maleic acid anhydrides. Certain of the synthetic alcohols prepared by the oxonation and hydrogenation reaction are known to be especially suitable for the manufacture of ester plasticizers and particularly for use in clear plastics. These include alcohols of from $C_4$ to $C_{12}$ range, and particularly, the octanols and the nonanols.

In a number of instances the ester products were found to be deficient as to the standards required for plasticizers, in such characteristics as odor, color, and plasticizing qualities such as the poor weathering tendency of the resins and plastics in which such plasticizers are used. These undesirable characteristics are believed to be caused by impurities present in the alcohol product and particularly to such impurity products present in the alcohol as aldehydes and substances which are potentially aldehydes. Materials which can affect ester color and odor include polymerized and condensed higher molecular weight impurities as well as the unreduced carbonyl compounds and other non-alcoholic compounds. It is the best practice to remove most of the carbonyl compounds in order to obtain alcohols which give acceptable ester plasticizers. These purifications are especially necessary if unreacted or excess alcohol is recycled to the esterification zone.

In typical alcohol recycle esterification operations, a 1 to 20% molal excess of alcohol is used based on the phthalic anhydride used. The esterification reaction is carried to substantial completion by esterification for a sufficient time. The unreacted alcohol is then stripped off from the ester product under reduced pressure and blended with fresh alcohol for returning to the esterification zone. Thus undesirable color and odor forming materials have the opportunity to build up during the recycle stages to a point at which they must be purged from the system before continuing the recycling operation. This presents impurity problems which occur even though the actual reaction is carried out in corrosion resistant or glass-lined equipment. The high temperature esterification is a much more severe test as to the purity and stability of the reactants and is more truly representative of severe plant scale esterification conditions.

There are regularly used a number of modified esterification procedures. Two of the main ones which are widely used for preparation of the dioctyl phthalate ester include the high temperature method in which one mole of phthalic anhydride is heated with approximately 2 to 2.4 moles of octyl alcohol. The ester may be prepared in a number of ways. In one such method, the ester is recovered by distilling, first, the unreacted alcohol and anhydride then finally the ester under reduced pressure. It is preferred to use the ester without distilling it, and this can be done if the alcohol is of sufficient purity. Although a number of finishing techniques are used, in all cases unreacted alcohol is distilled off for recycle. The catalytic method in which benzene sulfonic acid or a similar type material is used as a catalyst may be employed to give catalytic esterification at a lower temperature. The color degradation of isooctyl alcohol during esterification has also been found to be a function of time and completeness of esterification. It is believed that one type of reaction may generally be more sensitive to certain specific impurities than the other type, as for example, the acid-catalyzed method seems to be very sensitive to carbonyl type compounds. The ester color can be expressed in terms of a Hazen ester color number (Pt–Co Scale), a high number indicating a darkened, low quality ester product. An alcohol having a Hazen ester color of 75 to 100 is considered acceptable for commercial use. This standard test for ester color is described in the literature and is reported as A. S. T. M. D268–46.

The odor problem in both finished alcohol and ester products has also proved difficult, some distilled products having a distinct aldehydic odor. Ester products made from very pure alcohol by the high temperature method frequently carry a sweet or burned odor.

Alpha-beta unsaturated carbonyl compounds are also formed in the presence of acidic type catalysts and are believed to be bad color formers when present in the esterification reaction zones as they undergo polymerization and decomposition at the elevated temperatures used in the esterification. Thus it is necessary, in order to obtain the best grade alcohol for use as an esterifying agent, to esterify with a product free of aldehydic impurities. The removal of aldehyde impurities prevents the formation of large amounts of acetal and unsaturated ether by-products. It is also considered of primary importance to remove such high boiling materials as esters including formic acid esters which are usually present in up to 1% concentration.

It has now been discovered that those undesirable characteristics of the oxo alcohols can be essentially eliminated and a good grade alcohol produced which is satisfactory for use in preparing plasticizers of high quality by a combination one-step treatment process. This combined process consists in treating the alcohol with a relatively mild type of oxidizing agent and either simultaneously or as soon as possible thereafter subjecting the alcohol to a caustic washing operation using dilute aqueous caustic solution.

In one preferred modification of the process the crude oxo alcohol is refluxed for about one hour during which period air is bubbled through the entire mass of alcohol. The alcohol is then washed with 5–20% aqueous caustic solution and washed with water to remove residual caustic and water soluble impurities.

Table I shows the condition studied for the treatment operation and the marked improvements obtained thereby.

TABLE I

| Sample No. | Treatment Employed | Vol. Ratio Alc.:NaOH | Time Hrs. | Temperature | Phthalate Ester Color [1] (Hazen Pt-Co Scale) |
|---|---|---|---|---|---|
| 1 | | | | | 500+ |
| 2 | air–5% NaOH | 5:1 | 2 | Room | 175 |
| 3 | air–10% NaOH | 15:1 | 2 | do | 135 |
| 4 | air–10% NaOH | 5:1 | 0.75 | do | 125 |
| 5 | air–10% NaOH | 5:1 | 2 | 212° F | 125 |
| 6 | air–2% NaOH | 5:1 | 2 | Room | 135 |
| 7 | air–2% NaOH | 15:1 | 0.5 | do | 225 |
| 8 | air–no NaOH | | 2 | do | 500+ |

[1] Hazen color test values were obtained by examination of esters prepared by high temperature esterification of phthalic anhydride.

A typical treatment which gives products having Hazen ester color values 70 to 175 from a crude alcohol giving an ester color value of greater than 500 is carried out by treating crude isooctyl alcohol obtained by the oxo process and having color forming impurities with an approximately 10% sodium hydroxide solution in a ratio of five volumes of alcohol to one of caustic. The quality improvement which can be obtained by a specified treatment is related directly to the original quality of the oxo alcohol product being treated. For instance, a relatively poor product will appear to be relatively less improved by this air-caustic treatment than will a better grade crude alcohol. However, in an average grade crude $C_8$ oxo alcohol, the Hazen ester color will be in the range of 500+ before treatment, and about 100 subsequent to treatment with air and caustic.

While it is not known with complete certainty the beneficial effects which this treating method exerts to produce the high grade alcohol which is relatively free of the undesirable impurities causing ester color and odor, it is believed that certain impurities undergo reaction in the presence of the oxidizing agent to give other products which have increased caustic solubility and which are thus removed more efficiently from the alcohol by the simultaneous or subsequent caustic washing. The marked improvement in alcohol purity is indicated by the improvement in Hazen ester color noted particularly in products prepared with recycle alcohol.

It is considered within the scope of this invention that various types of oxidizing agents can be used such as hydrogen peroxide and alkaline potassium permanganate. It is considered best for operation to use an oxidizing agent of a mild type and one which is chemically compatible with an alkaline scrubbing operation conducted simultaneously.

It is also possible to employ pure oxygen or synthetic mixtures of oxygen plus an inert gaseous diluent rather than air. Both from effectiveness of treatment and convenience, and economy of operation, it is much preferred to employ air or oxygen containing gas as the oxidizing agent rather than a chemical oxidant.

In this connection, one precaution to be taken is that of avoiding the production of explosive mixtures of organic material with air or, those of an even more hazardous nature, the mixtures of organic material with oxygen. This difficulty arises particularly when the crude alcohol treated is of the type obtained directly from the oxo process in which there may be up to 25% of hydrocarbons having explosive tendencies over and above those of the alcohol products. To avoid this, it is often helpful to bleed in an inert gas such as nitrogen in order to stay outside the explosive concentration ranges by keeping the oxygen partial pressure relatively low. However, it is certain that the beneficial effects of this combined treatment are not due to oxidation and oxidative changes. This is readily shown by the fact that a treatment with air alone has little or no effect on the Hazen ester color value. Thus a caustic treatment is necessary to obtain maximum good result of carbonyl reduction. It has further been noted that this treatment of crude oxo alcohol by air and caustic has a beneficial purification effect in the splitting of acetals and removal of aldehydes produced thereby.

Furthermore the treatment with air and 10% caustic produced a decidedly greater improvement on the color of the ester produced from the alcohol than does a 10% caustic treatment alone as shown by the data of Table II below.

TABLE II

| Sample | Phthalate Ester Color (Hazen Pt–Co Scale) | | |
|---|---|---|---|
| | Untreated | Caustic Treated | Air-Caustic Treated |
| 1 | 500+ | 450 | 150 |
| 2 | 425 | 265 | 150 |
| 3 | 500 | 250 | 125 |
| 4 | 500+ | 450 | 250 |

It is especially unusual and unexpected that a treatment with air and an aqueous caustic solution would show such outstandingly desirable purification effects with a water immiscible alcohol product such as those of the $C_8$ and $C_9$ class. Since there are more or less two phases present during the treatment stages, it would be expected that beneficial purifications would not be obtained. The actual results show a surprising and unexpected improvement in the Hazen ester colors when a caustic treatment is accompanied by aeration, and there is essentially complete recovery of alcohol being treated. This indicates that during the treatment the alcohol product suffers little or no degradative attack which would result in a loss in alcohol recovery. Thus, although such a treatment, as described herein has been found to be highly desirable for purification of oxo alcohols of the $C_8$ and $C_9$ water-immiscible range, it would not be of great use for purification of the lower molecular weight alcohols showing an appreciable water-miscibility since the purification would not be so selective and at least a portion of the alcohol would be attacked by the air or other oxidizing agent used in the treatment operation. Thus the octyl and nonyl alcohols are shown to be surprisingly stable toward the oxidation while the impurities causing color and odor problems are quite unstable and reactive toward the oxidizing agents and are particularly responsive to an air treatment.

It is believed that the caustic treatment should follow in as quick succession as possible the exposure of the alcohol to the air or other oxidizing agent since the reformation of acetals from any aldehydes remaining and the formation of other additional impurities may be accelerated by air. Thus aldehydes which are converted to acidic materials removable by a caustic washing should be so removed as rapidly and completely as possible by such a washing treatment.

In following the preferred embodiment of this invention, a crude alcohol produced by the oxo synthesis, that is oxonation of an olefin followed by hydrogenation, is contacted with an aqueous caustic solution with simultaneous exposure to an oxygen-containing gas, as air, prior to a distillation operation. Although the treatment can be applied to a finished alcohol product, it is considered best practice to treat the crude provided precautions are taken to prevent the formation of explosive mixtures of oxygen and hydrocarbon impurities. It is also considered best from an economic standpoint to treat the crude alcohol itself since water washing and distillation operations are ordinarily necessary following the air-caustic treatment.

Furthermore, the air-caustic treatment should be applied as quickly as possible to the crude alcohol after it is obtained from the hydrogenation stage. This prevents further formation of impurities such as acetals which it is believed may be produced at least partially as a result of the catalytic effect of acidic compounds present.

The type of caustic considered to be most suitable for the treatment is an aqueous sodium hydroxide solution of 10% concentration although caustic concentrations in the range of 1% to 25% can be used. Low concentrations of alkali may cause troublesome emulsion formation and will do so particularly if air is being passed through the alcohol. Potassium hydroxide can also be used. While it is best to employ the caustic in an aqueous solution, solid sodium or potassium hydroxide can also be used. The treating solution can also be a non-aqueous solution of caustic, for instance, an alcoholic solution.

During the treatment, the air or other oxidizing agent employed is able to convert certain of the alkali-insensitive impurities into alkali-sensitive materials which are removed by the caustic. Some such action is indicated by the experimental data showing that a combined air and alkali treatment gives results far superior to those obtained by alkali treatment alone. This is especially true for alcohols of very poor quality.

The treatment with air and caustic solution should be carried out in such a manner as to assure very fast and thorough mixing of the two phases, but at the same time avoiding emulsion formation as much as possible. It may be necessary to add an emulsion inhibitor to the system to prevent subsequent difficulties in separation of the two phases. For continuous operations a countercurrent tower extraction process can be employed preferably with arrangement for injecting air at a single location or at a plurality of locations during the caustic treatment. For best results an orifice or baffle type mixer giving very intimate contact may be used.

The time of contact necessary to produce a good quality alcohol which can be converted to an ester meeting requirements of odor and color varies, depending on the concentration and kind of impurities in the alcohol and their susceptibility to oxidative treatment as well as on the concentration of caustic solution and temperature conditions employed. For instance, the stronger the caustic solution, the more air or oxygen-containing gas injected and the higher the temperature, the less time of contact required for obtaining excellent quality alcohol. A contact time of a few minutes has been shown to be effective while under less drastic treating conditions and more impure alcoholic feed stock the time required for effective treatment may be lengthened to 1 to 3 hours.

The temperature at which the treating operation is carried out is considered to be critical in that a satisfactory temperature must be employed in order to provide a treating operation which will yield maximum results in product quality improvement. Markedly better results are manifest when the caustic washing operation is carried out at temperatures above room temperature in the range of 150–175° F. if the treatment is only to be carried out for a short time. On the other hand, good results can be obtained at room temperature if the treating operation is prolonged for a period of 1 or 2 hours. Here, again, the quality of the original crude alcohol is of prime importance in adjusting the optimum treating conditions.

The ratio of caustic solution to the particular quantity of alcohol employed in the treating operation is not critical; however, it is of prime importance to use sufficient caustic to effect removal of substantially all the alkali sensitive impurities. A large excess will be uneconomical and can cause loss of alcohol product. Generally, for a crude oxo alcohol, an amount of aqueous caustic of 10 to 25% by volume based on the alcohol is satisfactory. Typical ratios employed are five parts alcohol to one part alkali.

The treatment can generally be carried out at or near atmospheric pressure, and it is frequently most convenient to do so. However, if the operation is done using crude alcohol and temperatures at which some of the components will normally be in the vapor state, a small amount of pressure may be necessary to keep unreacted olefins and hydrocarbons from the oxonation stage in liquid phase since they boil in the range of 200° F.

It is contemplated to be within the scope of this invention to carry out successive air and caustic treatment operations on the alcohol. The air treatment should ordinarily immediately precede or accompany the caustic treatment. Since the alcohol undergoing treatment will ordinarily be at least partially water immiscible and, therefore, relatively insoluble in the caustic wash solution, the alcohol and caustic mixture is taken to a phase separator or settling tank in which there are formed two phases, an aqueous caustic phase containing the dissolved impurities removed from the alcohol, and an organic phase of the purified alcohol.

The aqueous phase is separated and reused as wash liquid, if desired, provided it is not completely spent by absorption of reactive impurities in the alcohol. The alcohol, by the preferred mode of operation, is subjected to at least one water washing to remove last traces of caustic and solubilized impurities. The washing operation is especially necessary if the next step is to be a distillation or rectification of the alcohol since during distillation, the alkali content of the oxo alcohol should be held to a minimum to avoid undesirable side reactions and decomposition. In normal type of operations, a distillation step will follow the air-caustic treatment as a distillation is considered to be necessary.

The types of alcohol feed stock best adapted and generally those most requiring this type of air-caustic treatment are crude alcohol mixtures derived from the so-called oxo process and are water immiscible. This range generally includes alcohols above $C_5$ and up to those of the $C_{12}$ to $C_{14}$ range. It is contemplated that the process will have the widest and most useful application to purify oxo alcohols of the $C_8$ and $C_9$ range which are exactly those alcohols of most useful and desirable properties for making ester plasticizers. For instance a typical $C_8$ feed stock which can be purified by the method herein-disclosed to give a product yielding ester plasticizers of high purity and improved qualities in both odor and color may be characterized as one produced from the oxo synthesis using a $C_7$ olefin feed, the resulting crude alcohol having a boiling range of 150° F. to 400° F.; and consisting essentially of 25% saturated hydrocarbons, 60% alcohol boiling at 350°–372° F. and 15% bottoms. The alcohols are branched chain isomers of octyl alcohol and are of the primary class.

A crude isooctyl alcohol product having the above outlined characteristics was continuously treated in a mixing unit with 10 weight percent concentration of aqueous sodium hydroxide solution at varying temperatures and times of contact, air being continuously injected into the mixing unit throughout the period of contact time with the caustic. Following the air and caustic treatment, the aqueous and alcohol phases were separated and the alcohol was water washed, and distilled.

The alcohol fractions so obtained including both a heart cut and a cut having a broader distillation range, were employed in the standard esterification reaction by refluxing for one hour with phthalic anhydride to prepare dioctyl phthalate. The data reported below in Table III show the distinct improvements in alcohol quality which resulted from the air-caustic treatment as shown by the marked color improvement of the ester, and show the effects of varying the temperature and time on the quality improvement obtained. The odor of the ester was also decidedly improved by the caustic treatment.

The alcohol heart cut for which ester tests are shown in Table III was obtained by subjecting the treated alcohol to a fractionation and collecting a cut of overhead vapors distilling in the range of 360–370° F. The oxo alcohol cut, for which ester tests are shown in Table III, was obtained during a fractional distillation of the treated alcohol by taking an overhead fraction between an overhead vapor temperature of 350° F. and a pot temperature of 580° F. The latter cut is of a wider range and recovers more oxo alcohol but is taken at temperatures to avoid contamination of the alcohol by unremoved higher boiling impurities.

TABLE III

*Effects of air and caustic treat on ester color of isooctyl alcohol*

| Sample | Air-NaOH Treat[1] | | Yield[2] Weight Percent | Phthalate Ester Color (Hazen Pt-Co Scale) | |
|---|---|---|---|---|---|
| | Time | Temp., °F. | | Alcohol Heart Cut 360–370° F. (Vapor Temp.) | Oxo Alcohol Cut 340 (V.T.)– 580° F. (Pot. Temp.) |
| A | None | None | | 500+ | 500+ |
| A | 2 Hrs | Room | | 100 | 150 |
| A | ½ Hr | do | | 250 | 500+ |
| A | 1 Min | 175 | | 130 | 500 |
| B | None | None | 53.0 | | 425 |
| B | 2 Hrs | Room | | 100 | 150 |
| C | None | None | 54.7 | 250 | 500+ |
| C | 2 Hrs | Room | | | 125 |
| D | None | None | 51.9 | 175 | 250 |
| D | 5 Min | Room | | 70 | 200 |
| D | 1 Min | do | 50.9 | 175 | 200 |
| D | 1 Min | 165 | | 110 | 150 |
| D | ½ Min | 185 | 51.5 | 125 | 140 |
| E | None | None | | | 500+ |
| E | 2 Hrs | Room | 50.7 | 65 | 135 |
| E | 2 Hrs | do | 50.8 | 60 | 125 |
| E | 2 Hrs | do | 51.6 | 80 | 135 |
| E | ¾ Hr | do | 50.1 | 60 | 125 |
| E | ¼ Hr | do | 51.3 | 100 | 225 |
| F | None | None | | 450 | 500+ |
| F | 2 Hrs | Room | | 125 | 250 |
| G | None | None | | | 500+ |
| G (Alcohol Cut) | 2 Hrs | Room | | | 100 |

[1] 5 to 1 volume ratio alcohol to 10% NaOH.
[2] Yield of total alcohol (340° F. vapor temperature to 580° F. bottoms temperature) on crude.

A series of comparative experiments were carried out on crude C8 oxo alcohols.

The data obtained are shown in Table IV. The relative advantage of a continuous type distillation following the air-caustic treatment as compared to a batch type distillation are seen in a comparison of alcohol and ester properties in columns 2 and 3 of Table IV.

TABLE IV

*Effects of air-caustic treatment on properties of $C_8$ oxo alcohol*

| Sources | 1 | 2 | 3 |
|---|---|---|---|
| Treatment of crude alcohol | None | Air-caustic | Air-caustic |
| Distillation of crude alcohol | Batch | Batch | Continuous |
| Alcohol as $C_8$, weight percent | 97 | 98 | 99.1 |
| Chemical Analysis: | | | |
| Acids as $C_8$ | 0.2 | 0.0 | 0.0 |
| Free Carbonyls as $C_8$ | 0.1 | 0.0 | 0.0 |
| Acetals as $C_{24}$ | 2.5 | 1.1 | 0.4 |
| Esters as $C_9$ | 1.1 | 0.2 | 0.1 |
| Water | 0.4 | 0.2 | 0.1 |
| Acidity, as HOAc, weight percent | 0.10 | 0.00 | 0.00 |
| Moisture, weight percent | 0.40 | 0.22 | 0.10 |
| Distillation, °C: | | | |
| Initial | 177 | 177 | 186.5 |
| Final | 206 | 199 | 204 |
| Color of Phthalate Ester, Hazen Scale[1] | [2] 350 | 200 | 130 |

[1] Prior to the removal of excess alcohol.
[2] Light yellow.

It should be noted from the data in Table IV that the air-caustic treating of the crude oxo alcohol effects substantial reduction in acids, free carbonyls, acetals, and esters. Aldehyde concentration is reduced to zero, while acetals, potentially aldehydes, are substantially reduced in the treated alcohols. The removal of acidic materials and esters is also of advantage. All these materials are known to be detrimental when allowed to remain in alcohol which is to be used for esterification. Use of a continuous distillation technique following the air-caustic treatment gives somewhat better results compared to a batch distillation.

These data indicate, that, at the same time, this purification method is quite selective in that it increased the overall alcohol purity showing that the treatment is very selective, and is an effective type of purification for crude oxo alcohol products which must meet the highest grade specifications and which, when crude, contain various concentrations of impurities commonly occurring in oxo alcohols.

The treating will also remove certain other undesirable impurities, including low molecular weight acidic compounds either initially present or produced by the oxidation treatment. In addition, certain non-acidic compounds, including such impurities as alpha-beta unsaturated carbonyls, which are known to be color producing bodies during esterification reactions, will be removed in limited amounts.

Consequently, the high boiling impurities, not so extracted, are conveniently removed by distillation. It is of particular advantage to combine the air-caustic treatment operation with a subsequent distillation step and possibly other purification procedures as are required for the particular impurities present in the crude product being handled.

It is further contemplated that at the same time during which this air-caustic treatment is being carried out, the alcohol may be maintained in contact with an absorbent material such as activated charcoal in order to achieve a better overall result from the air-caustic treatment itself and/or an additional beneficial effect from the presence of the absorbent.

Other modifications and modes of applications within the spirit of the invention will be apparent to those skilled in the art.

I claim:

1. In the synthesis of water-immiscible alcohols having from 6 to 14 carbon atoms in a two-stage operation consisting of a first stage in which hydrogen, carbon monoxide and an olefin are contacted in the presence of an oxygenation catalyst forming a product predominantly aldehyde and of a second stage in which the said aldehyde is catalytically reduced with hydrogen to form the corresponding alcohol containing ester color producing impurities including aldehydes and acetals, and which is later subjected to distillation as a purification technique, the improvement consisting of extracting in the liquid phase the crude water-immiscible alcohol product at least once prior to distillation with an aqueous caustic solution of from 1% to 25% concentration at temperatures above 150° F. and simultaneously aerating the alcohol, thereafter permitting the mixture to stratify into a lower aqueous layer and an upper alcohol layer, separating the thus purified alcohol from the aqueous layer, washing the alcohol free of caustic, and subjecting the said alcohol to continuous distillation to give purified alcohol product, relatively free of ester color forming impurities, including aldehydes and acetals.

2. The process as in claim 1 in which the crude water-immiscible alcohol is a mixture of $C_8$ alcohols.

3. The process as in claim 1 in which the temperature employed in the extraction step is between 150° and 175° F.

CECIL H. HALE.

REFERENCES CITED

The following references are of record in the file of this patent:

UNITED STATES PATENTS

| Number | Name | Date |
|---|---|---|
| 1,833,331 | Park | Nov. 24, 1931 |
| 1,979,303 | Woodhouse | Nov. 6, 1934 |
| 2,139,179 | Tulleners | Dec. 6, 1938 |
| 2,188,274 | Bump | Jan. 23, 1940 |
| 2,356,689 | Ozol et al. | Aug. 22, 1944 |
| 2,451,857 | Miskel et al. | Oct. 19, 1948 |
| 2,486,693 | Spijker et al. | Nov. 1, 1949 |